(12) United States Patent
McConnell

(10) Patent No.: US 12,301,088 B2
(45) Date of Patent: May 13, 2025

(54) SYSTEM AND METHOD FOR PRODUCING ELECTRICITY

(71) Applicant: McConnell Moran Technologies Corporation, Nisku (CA)

(72) Inventor: David Leonard McConnell, Edmonton (CA)

(73) Assignee: McConnell Moran Technologies Corporation, Nisku (CA)

( * ) Notice: Subject to any disclaimer, the term of this patent is extended or adjusted under 35 U.S.C. 154(b) by 0 days.

(21) Appl. No.: 18/603,675

(22) Filed: Mar. 13, 2024

(65) Prior Publication Data

US 2024/0313618 A1    Sep. 19, 2024

Related U.S. Application Data

(60) Provisional application No. 63/489,914, filed on Mar. 13, 2023.

(51) Int. Cl.
*H02K 7/18*     (2006.01)
*F01K 15/00*    (2006.01)

(52) U.S. Cl.
CPC ............. *H02K 7/183* (2013.01); *F01K 15/00* (2013.01)

(58) Field of Classification Search
CPC ................................. H02K 7/183; F01K 15/00
See application file for complete search history.

(56) References Cited

U.S. PATENT DOCUMENTS

| | | | |
|---|---|---|---|
| 6,053,418 A | 4/2000 | Guyer | |
| 6,955,052 B2 | 10/2005 | Primlani | |
| 8,448,439 B2 | 5/2013 | Namba et al. | |
| 9,111,652 B2 | 8/2015 | Zhang et al. | |
| 9,200,622 B2 | 12/2015 | Sakadjian et al. | |
| 9,567,875 B2 * | 2/2017 | Chaen | F01K 7/16 |
| 10,632,397 B1 | 4/2020 | Frick | |
| 10,961,874 B2 * | 3/2021 | Al-Ghizzy | F01K 27/005 |
| 11,473,451 B2 | 10/2022 | Wang | |
| 11,828,201 B2 * | 11/2023 | Al-Ghizzy | C02F 1/14 |
| 11,905,172 B2 * | 2/2024 | Warner | F25J 3/04339 |
| 2008/0202028 A1 * | 8/2008 | Tsangaris | C10J 3/723 48/202 |
| 2012/0121468 A1 * | 5/2012 | Tsangaris | C10J 3/463 422/105 |

(Continued)

FOREIGN PATENT DOCUMENTS

CN    205222730 U    5/2016
CN    108167027 B    6/2018

(Continued)

*Primary Examiner* — Tulsidas C Patel
*Assistant Examiner* — Thomas K Quigley
(74) *Attorney, Agent, or Firm* — Finch & Maloney PLLC

(57) ABSTRACT

A system and method of producing electricity is provided. Fluid is pumped from a feed tank to a steam generator using a pump. The steam generator has a high temperature heater for heating the fluid and increasing pressure before the fluid travels to a steam chamber. The fluid flows from the steam generator to the steam chamber. At least one chemical that creates an exothermic reaction is injected into an ignition chamber and the chemical reaction is initiated using an igniter. The exothermic reaction increases the energy available in the system. Fluid from the steam chamber flows through a steam turbine to generate electricity.

20 Claims, 2 Drawing Sheets

(56) References Cited

U.S. PATENT DOCUMENTS

| | | | |
|---|---|---|---|
| 2013/0229018 A1* | 9/2013 | Karni | F02C 3/20 |
| | | | 60/39.12 |
| 2013/0300121 A1* | 11/2013 | Ali | F23J 15/02 |
| | | | 110/221 |
| 2014/0183863 A1* | 7/2014 | Thillen | F01K 7/00 |
| | | | 290/2 |
| 2015/0007568 A1* | 1/2015 | Chaen | F01K 7/16 |
| | | | 60/329 |
| 2017/0254315 A1* | 9/2017 | Al-Ghizzy | F01K 25/06 |
| 2018/0322968 A1 | 11/2018 | Cheatham, III et al. | |
| 2020/0168348 A1 | 5/2020 | Wong | |
| 2021/0293157 A1* | 9/2021 | Al-Ghizzy | F01K 25/06 |
| 2021/0300759 A1* | 9/2021 | Warner | F25J 3/04612 |
| 2024/0141807 A1* | 5/2024 | Al Ghizzy | F01K 15/00 |

FOREIGN PATENT DOCUMENTS

| | | | |
|---|---|---|---|
| CN | 207486932 U | 6/2018 | |
| CN | 110518835 A | 11/2019 | |
| WO | 2004065763 A2 | 8/2004 | |
| WO | 2011148422 A1 | 12/2011 | |
| WO | 2014205430 A1 | 12/2014 | |

* cited by examiner

SYSTEM AND METHOD FOR PRODUCING ELECTRICITY

FIELD OF THE DISCLOSURE

The present application relates generally to a system and method for producing electricity.

BACKGROUND

This section provides background information to facilitate a better understanding of the various aspects of the invention. It should be understood that the statements in this section of this document are to be read in this light, and not as admissions of prior art.

Electricity needs continue to increase globally. Electric cars and larger populations are likely to put a strain on existing infrastructure. In addition, more people and countries are starting to move away from fossil fuels or are taking steps to move away from fossil fuels in the future. This will place a greater importance on green technologies and new ways of producing electricity.

BRIEF SUMMARY

There is provided a system of producing electricity that includes a feed tank, a steam generator, a steam chamber, and a steam turbine. The feed tank contains a fluid that is pumped through an outlet of the feed tank to a steam generator by a pump. The steam generator has a high temperature heater for heating fluid before the fluid enters the steam chamber. The steam chamber is provided in fluid communication with the steam generator and fluid from the steam generator flows into the steam chamber. The steam chamber has a chemical injection port through which at least one chemical that creates an exothermic reaction is injected into a perforated ignition chamber. The perforated ignition chamber has an electric igniter that may be used to initiate a chemical reaction. The steam turbine is provided in fluid communication with the steam chamber such that fluid from the steam chamber flows through the steam turbine to generate electricity.

In one embodiment, the fluid is water.

In one embodiment, the feed tank has at least one heater for heating the fluid.

In one embodiment, an atmospheric hydraulic extraction system that is capable of reducing the pressure within the steam generator to below atmospheric pressure is provided in communication with the steam generator for removing air from the steam generator and the system.

In one embodiment, the pressure within the steam generator is reduced to 5 psi.

In one embodiment, the steam generator has at least one heater to further heat the steam.

In one embodiment, the steam chamber has a fluid pipe in fluid communication with the perforated ignition chamber. The fluid pipe carries fluid having a pressure of between 1400 psi to 3000 psi at a temperature of 30 degrees Fahrenheit to 60 degrees Fahrenheit. The flow of fluid through the fluid pipe being controlled by a high pressure pump.

In one embodiment, an electric storage, such as a battery, is provided in communication with the steam turbine for storing generated electricity. In some embodiments, the generated electricity is used immediately, sent to the grid, or a combination of storage, immediate use and/or sending to the grid is completed.

In one embodiment, the chemicals injected into the perforated ignition chamber include hexane, sodium azide, and ethylene oxide. The exothermic reaction created by the reaction of these chemicals increases the amount of electricity that can be generated by the system.

In one embodiment, 4-20 grams of hexane, 2-16 grams of sodium azide and 1-12 grams of ethylene oxide are injected into the perforated ignition chamber for each 500 kilowatts to be created by the system.

In one embodiment, fluid flowing through the steam turbine is returnable to the feed tank through an inlet for re-use.

There is also provided a method of producing electricity. A fluid is supplied to a steam generator. The temperature of the fluid is increased to between 1500 degrees Fahrenheit to 2100 degrees Fahrenheit and pressure is increased to at least 800 psi within the steam generator before the fluid flows to the steam chamber. The steam chamber has a chemical injection port in communication with a perforated ignition chamber. The perforated ignition chamber has an igniter. At least one chemical that creates an exothermic reaction is injected into the perforated ignition chamber and the ignitor is used to initiate the exothermic reaction. The fluid flows from the steam chamber through a steam turbine to generate electricity.

In one embodiment, the fluid is water.

In one embodiment, a further step of heating the fluid being supplied to the steam generator in a feed tank to a temperature within 10 degrees Fahrenheit of boiling is completed prior to supplying the fluid to the steam generator.

In one embodiment, a further step of reducing the pressure within the steam generator to remove air from the steam generator is completed prior to increasing the temperature of the fluid within the steam generator.

In one embodiment, the pressure within the steam generator is reduced to 5 psi.

In one embodiment, the steam chamber has a fluid pipe in fluid communication with the perforated ignition chamber. The fluid pipe carries fluid having a pressure of between 1400 psi to 3000 psi at a temperature of 30 degrees Fahrenheit to 60 degrees Fahrenheit. The flow of fluid through the fluid pipe being controlled by a high pressure pump.

In one embodiment, an electric storage, such as a battery, is provided in communication with the steam turbine for storing generated electricity. In some embodiments, the generated electricity is used immediately, sent to the grid, or a combination of storage, immediate use and/or sending to the grid is completed.

In one embodiment, the chemicals injected into the perforated ignition chamber include hexane, sodium azide, and ethylene oxide. The exothermic reaction created by the reaction of these chemicals increases the amount of electricity that can be generated by the system.

In one embodiment, 4-20 grams of hexane, 2-16 grams of sodium azide and 1-12 grams of ethylene oxide are injected into the perforated ignition chamber for each 500 kilowatts to be created by the system.

In one embodiment, fluid flowing through the steam turbine is returnable to the feed tank through an inlet for re-use.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

FIG. 1 is a schematic view of the system for producing electricity.

DETAILED DESCRIPTION OF THE PREFERRED EMBODIMENTS

Figure 2:
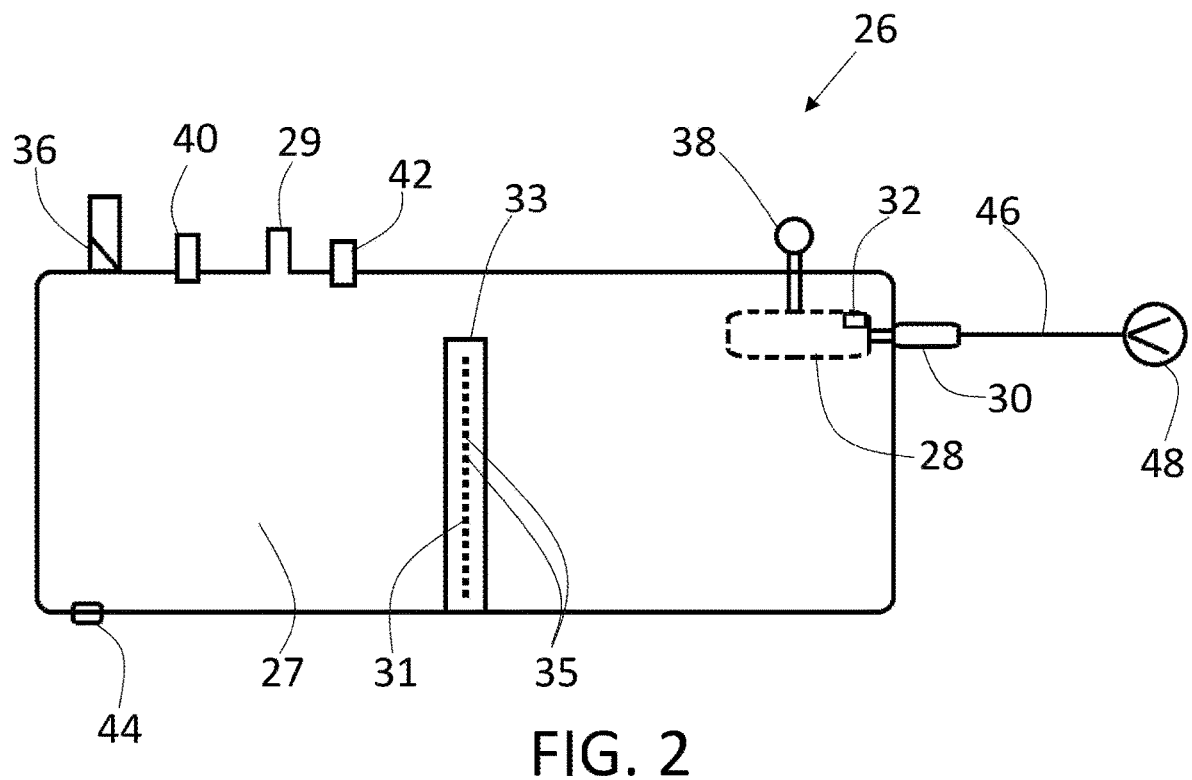
FIG. 2 is a schematic view of the steam chamber.
Figure 3:
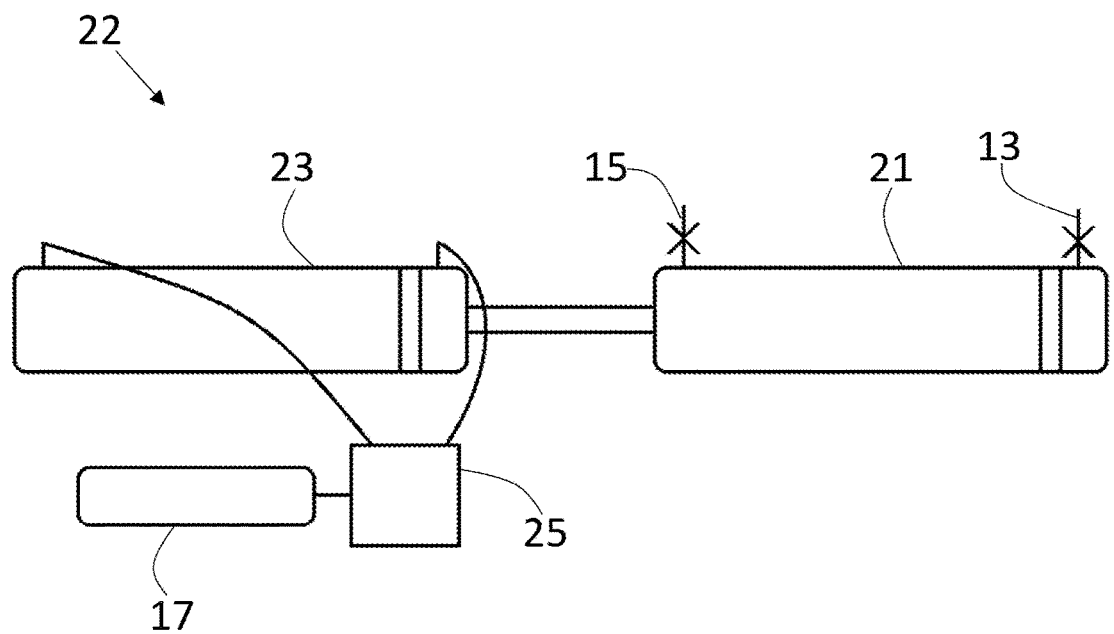
FIG. 3 is a schematic view of the atmospheric hydraulic extraction system.

A system for producing electricity, generally identified by reference numeral 10, will now be described with reference to FIG. 1 through FIG. 3.

Figure 1:
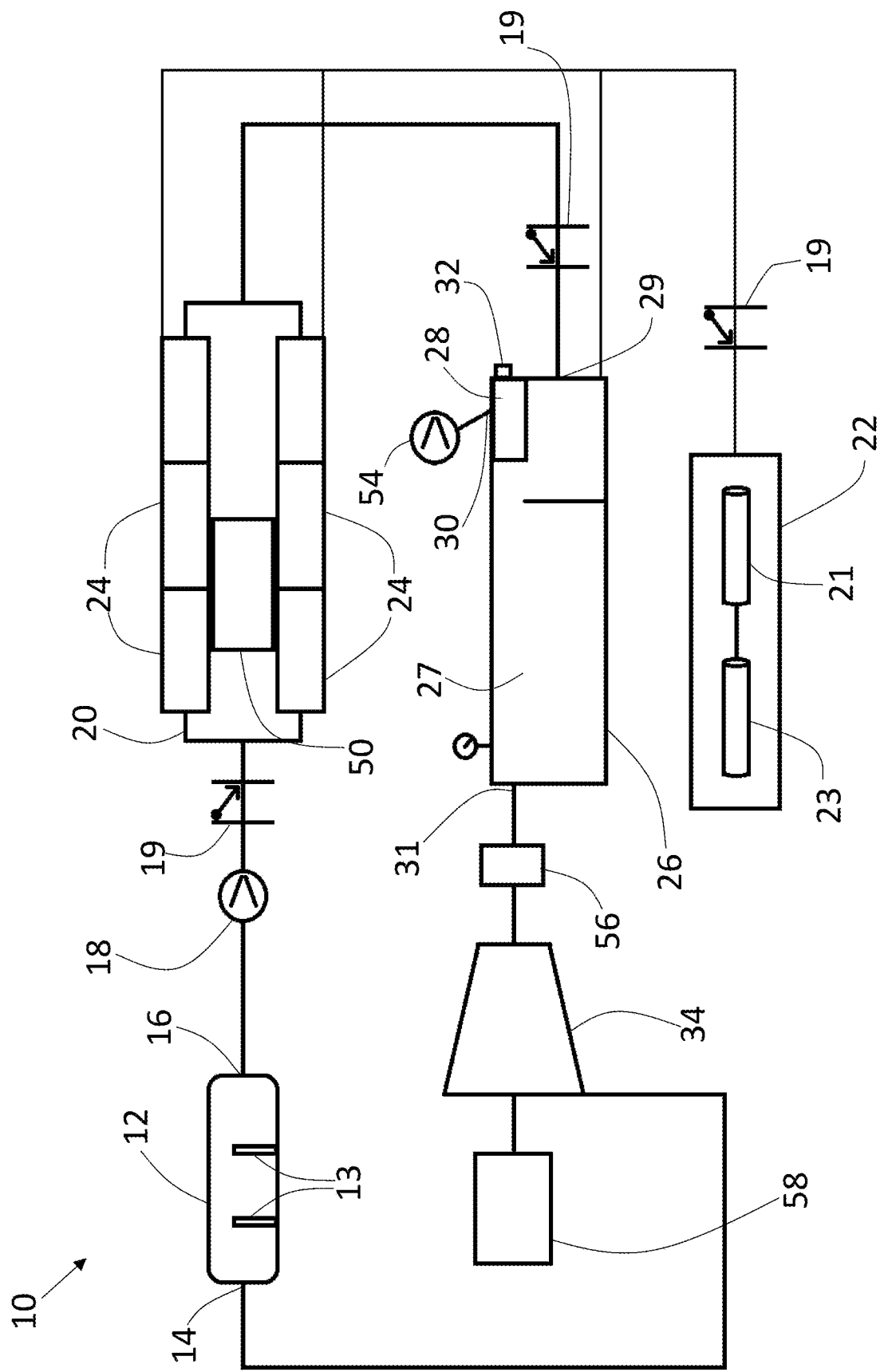

Referring to FIG. 1, system 10 has a feed tank 12 that has an inlet 14, an outlet 16 and at least one heater 13. In the embodiment shown, two immersion heaters 13 are used. It will be understood by a person skilled in the art that other types and different numbers of heaters 13 may be used. Feed tank 12 contains a fluid that is used throughout system 10. While fluid may be any suitable fluid known to a person skilled in the art, the most common fluid used is water. The fluid may be decontaminated, if needed, through boiling, filtering, or any other suitable method prior to be placed in feed tank 12 or once in feed tank 12. Heater 13 is activated as needed to maintain the temperature of fluid in feed tank 12 at a predetermined temperature at or near boiling. Where the fluid is water, the water is maintained at a temperature of 210 degrees Fahrenheit to 212 degrees Fahrenheit. Fluid is preferably heated to within 10 degrees Fahrenheit of boiling. It will be understood by a person skilled in the art that fluid may not be heated in feed tank 12. If fluid is not heated in feed tank 12, heaters 13 are not required. However, heating of fluid in feed tank 12 helps to maintain system 10 in operation as less energy is lost during use.

A pump 18 is provided for pumping fluid through outlet 16 of feed tank 12 to a steam generator 20. In the embodiment shown, a check valve 19 is positioned between pump 18 and steam generator 20 to prevent fluid from flowing backwards within system 10. It will be understood by a person skilled in the art what types of check valves are suitable for use in system 10. Steam generator 20 is a pressure vessel. A high temperature heater 50 is provided within steam generator 20 to increase temperature of fluid to 1500 degrees Fahrenheit to 2100 degrees Fahrenheit. When steam generator 20 is at least three quarters filled with fluid having a temperature of between 1500 degrees Fahrenheit to 2100 degrees Fahrenheit, the pressure within steam generator 20 is 800 psi to 1000 psi. Additional heaters 24 may be provided to aid in the heating process of the fluid. When pressure within steam generator 20 is greater than 800 psi, fluid travels to steam chamber 26 due to the difference in pressure between steam generator 20 and steam chamber 26.

Steam generator 20 is provided in communication with an atmospheric hydraulic extraction system 22 that is powered from a power source such as a generator, the grid, or a power storage such as a battery. Atmospheric hydraulic extraction system 22 is used to remove air and contaminants from system by reduced pressure within steam generator 20 to below atmospheric pressure through the use of vacuum pressure to pull out air within steam generator 20. Atmospheric hydraulic extraction system 22 may be any suitable vacuum pump known to a person skilled in the art. In the embodiment shown in FIG. 3, atmospheric hydraulic extraction system 22 has a first hydraulic piston 21 and a second hydraulic piston 23 attached to a hydraulic pump 25. Hydraulic fluid is contained within a hydraulic oil tank 17 and is pumped into and out of second hydraulic piston 23 by hydraulic pump 25 to create movement of first hydraulic piston 21 and second hydraulic piston 23. First hydraulic piston 21 has a directional flow control valve, not shown, such that the direction of the stroke of first hydraulic piston 21 changes to allow for pulling of air into and expelling of air out of first hydraulic piston 21 regardless of the direction of travel of first hydraulic piston 21. Movement of second hydraulic piston 23 causes movement of first hydraulic piston 21. Air flows from steam generator 20 into first hydraulic piston 21 through piston inlet/outlet 13 and is expelled through piston inlet/outlet 15 through movement of first hydraulic piston 21 and second hydraulic piston 23. Piston inlet/outlet 13 and piston inlet/outlet 15 act as inlets or outlets depending upon the positioning of directional flow control valve. When piston inlet/outlet 13 acts as an outlet, air is expelled through piston inlet/outlet 13 and a T joint with a ball valve, not shown, positioned along the line between steam generator 20 and atmospheric hydraulic extraction system 22. It will be understood by a person skilled in the art that expelled air may be captured in a holding tank, not shown, to ensure contamination of the environment does not occur. Piston heads are preferably made of tungsten rhenium to allow them to withstand high pressure and temperature, however it will be understood by a person skilled in the art that piston heads made of other materials may also be used as long as they are able to withstand the necessary pressure and temperature of system 10. Referring to FIG. 1, a check valve 19, is provided on the connection line between steam generator 20 and atmospheric hydraulic extraction system 22 to ensure that air pulled from steam generator 20 by atmospheric hydraulic extraction system 22 does not flow backwards into steam generator 20. Pressure within steam generator 20 is reduced to pull air and contaminants from steam generator 20. While a person of skill will understand that different drops in pressure are achievable, in the present embodiment, pressure is reduced from atmospheric pressure of 14.7 psi to 5 psi. Atmospheric hydraulic extraction system 22 is utilized during start up, including restarting after a shut down, to remove air from system 10. The removal of air from system 10 greatly improves efficiency. Once the appropriate pressure reduction has been reached, which is indicative of a removal of the majority of air from system 10, atmospheric hydraulic extraction system 22 is shut down. Since atmospheric hydraulic extraction system 22 reduces pressure within steam generator 20, it should not be used during regular operation of system 10. Atmospheric hydraulic extraction system 22 may be used to help reduce pressure in the event of an emergency situation.

Steam chamber 26 is provided in fluid communication with steam generator 20 to allow fluid from steam generator 20 to be pumped to steam chamber 26. In the embodiment shown, a check valve 19 is positioned on the connection between steam generator 20 and steam chamber 26 to prevent the backflow of fluid to steam generator 20. Steam chamber 26 is a pressure vessel. Fluid created in steam generator 20 flows into steam chamber 26 where pressure is further increased to add more energy to system 10. Fluid enters a hollow interior 27 of steam chamber 26 through steam chamber inlet 29 and additional energy is provided to fluid through the use of an exothermal chemical reaction that occurs and is initiated within a perforated ignition chamber 28 of steam chamber 26. The additional energy further increases the pressure within steam chamber 26. A chemical injection port 30 is provided in steam chamber 26 to inject at least one chemical into perforated ignition chamber 28 and an ignitor 32 is provided to initiate the chemical reaction within perforated ignition chamber 28. An electric ignitor is a common type of ignitor that may be used. It will be understood by a person skilled in the art that other types of ignitors may be used. An injection pump 54 is provided for injecting chemicals through chemical injection port 30. Perforated ignition chamber 28 is positioned within hollow interior 27 and keeps the chemicals in proximity to each other pending ignition of the chemical reaction. While different chemicals may be used to create useful exothermic reactions, it is preferable that the chemical reaction be sufficient to increase the pressure within steam chamber by 20-80%. In one embodiment, a combination of hexane, sodium azide, and ethylene oxide is injected through chemical injection port 30 into perforated ignition chamber 28. The amount of each chemical may vary depending upon the extent of the chemical reaction that is required or preferred. The use of 4-20 grams of hexane, 2-16 grams of sodium azide, and 1-12 grams of ethylene oxide may be used. It has been found that a combination of 14 grams of hexane, 10 grams of sodium azide, and 4 grams of ethylene oxide create a suitable reaction when steam chamber 26 having a size of 540 gallons is used to increase the pressure within steam chamber 26 from 800 psi to 1450 psi. When these chemicals are used, system 10 creates 500 kilowatts of electricity. It will be understood by a person skilled in the art that larger or smaller steam chamber 26 may be used when creating larger or smaller amounts of electricity. It will be understood by a person skilled in the art that different amounts of chemicals may be required depending upon the size of steam chamber 26. It is preferable that the chemicals be in a dry pellet form or frozen pellet form as this makes it easier to handle and transport the chemicals and also helps to limit reactions between chemicals until after initiated with ignitor 32. Chemicals are injected into perforated ignition chamber 28 and ignited using ignitor 32 during start up procedures, including after a shut down but should occur after fluid has entered steam chamber 26. Injection and ignition of chemicals may also occur at predetermined times to maintain a positive net electricity production of system 10. Referring to FIG. 2, to aid in ignition of chemicals, prevent accidental ignition, and push the energy created by the reaction to hollow interior 27 of steam chamber 26, a fluid pipe 46 is provided in fluid communication with perforated ignition chamber 28. Fluid being pumped through fluid pipe 46 should be the same as fluid in feed tank 12. Fluid is pumped by a high pressure pump 48 into perforated ignition chamber. High pressure pump 48 and injection pump 54 may be the same pump or two different pumps. Fluid should be at a temperature between 30 degrees Fahrenheit to 60 degrees Fahrenheit and at a pressure of 1400-3000 psi. When high pressure pump 48 is activated, high pressure fluid flows through fluid pipe 46 into perforated ignition chamber 28. Activation of high pressure pump 48 is completed at the same time as ignitor 32 is activated. Fluid exits hollow interior 27 of steam chamber 26 through an outlet 31. In the embodiment shown in FIG. 2, outlet 31 is a baffle 33 having a plurality of perforated apertures 35. By placing outlet 31 centrally within hollow interior 27 with a plurality of perforated apertures 35, this helps ensure that fluid exiting through outlet 31 is highly pressurized and is forced out of steam chamber 26 instead of fluid having a lower pressure easily flowing from steam chamber 26. It will be understood by a person skilled in the art that outlet 31 may be placed in any other suitable location in steam chamber 26 to allow fluid to move from steam chamber 26 to steam turbine 34. For safety purposes, steam chamber 26 is equipped with a safety relief valve 36 and a back-up safety relief valve 38. A high pressure steam sensor 40 and a temperature sensor gauge 42 provide information related to pressure and temperature within steam chamber 26 and can be useful when automating the system and/or determining when to inject and ignite chemicals. A drain 44 is provided to allow for drainage of fluid when steam chamber 26 is not in use or for safety purposes. It will be understood by a person skilled in the that additional sensors and gauges, safety valves, and other safety features may be provided.

Steam turbine 34 is provided in fluid communication with steam chamber 26 such that fluid exiting outlet 31 of steam chamber flows through steam turbine 34 to generate electricity using generator 58. It will be understood by a person skilled in the art any suitable steam turbine known in the art may be used in the generation of electricity. In the embodiment shown, a steam regulator 56 is provided for controlling the flow of fluid out of steam chamber 26 and into steam turbine 34. High pressurized steam moving through steam turbine 34 will generate greater electricity than lower pressurized steam moving through steam turbine 34. Generated electricity may be used immediately, sent to the grid, and/or stored in an electrical storage such as a battery. The destination of the generated electricity may be determined by a user with the flow of generated electricity being controlled by wires, breakers, switches, or any other method known to a person skilled in the art. Generated electricity may be directed to a single location or multiple locations depending upon the user's preference. In some embodiments, storing electricity for operation of atmospheric hydraulic extraction system 22, pump 18, heaters 24, high pressure pump 48, or any other element of system 10 that requires the use of electricity to operate can allow for start up and operation in the event of other power failures. After fluid flows through steam turbine 34, it is preferable that fluid return to feed tank 12 through inlet 14 for re-use. This creates a closed loop system that helps to prevent power loss during use. A person of skill will understand that fluid may also be vented to the atmosphere, however this will result in a loss of electric potential since the system would become an open system. Net production of electricity in system 10 is generated through a combination of chemical reactions and the electricity used to power various elements of system 10. The chemical reaction used is a non-nuclear, exothermic reaction.

While not shown, a person of skill will understand that pressure relief valves may be positioned throughout system 10 for safety purposes. Common locations for pressure relief valves can include on steam generator 20 and on steam chamber 26. Additional pressure relief valves may be positioned on other parts of system 10. Due to the high temperatures and pressures possible within system 10, it is recommended that a blast proof shroud be provided to contain system 10 in the event of a failure of any part of system 10.

During start up procedures, fluid from feed tank 12 is pumped by pump 18 into steam generator 20. While it is preferred that fluid be heated to a temperature at or near boiling by heaters 13, fluid may not be heated. After fluid has been pumped from feed tank 12 to steam generator 20, feed tank 12 is refilled with fluid. Fluid in feed tank may be heated to a temperature at or near boiling by heaters 13. Operation of heaters 13 and pump 18 may be manual or automated through the use of computer programs. Where computer programs are used, operation of heaters 13 is controlled based upon the temperature of fluid within feed tank 12. When fluid drops below a predetermined temperature, heaters 13 are turned on to increase temperature of the fluid. Once a second predetermined temperature is reached, heaters 13 are turned off. While not shown, it will be understood by a person skilled in the art that feed tank 12 may have sensors that measure temperature. Sensors may be in communication with a computer to allow the computer program to manage operation of heaters 13. Pump 18 is activated as needed to maintain sufficient fluid in steam generator 20.

During start up procedures, after fluid is pumped from feed tank 12 into steam generator 20, atmospheric hydraulic extraction system 22 is activated and the pressure within steam generator 20 is dropped to a predetermined low pressure which is below atmospheric pressure. On initial start up, steam generator 20 is generally at atmospheric pressure and the pressure is dropped to 5 psi. It will be understood by a person skilled in the art that steam generator 20 may be at different pressures depending upon how long system 10 has been in an inoperative state. Atmospheric hydraulic extraction system 22 removes air and contaminates from system 10. Once the predetermined low pressure has been reached, atmospheric hydraulic extraction system 22 is deactivated. Operation of atmospheric hydraulic extraction system 22 may be operated manually or automated through the use of computer programs. Where computer programs are used, operation is controlled by identifying start up conditions and pressure conditions within steam generator. While not shown, it will be understood by a person skilled in the art that steam generator 20 may have sensors that measure pressure to allow for proper automation.

Following deactivation of atmospheric hydraulic extraction system 22, high temperature heater 50 and additional heaters 24, when provided, are activated. Fluid within steam generator 20 is increased to a temperature of between 1500 degrees Fahrenheit to 2100 degrees Fahrenheit. When steam generator 20 is at least three quarters filled with fluid having a temperature of between 1500 degrees Fahrenheit to 2100 degrees Fahrenheit, the pressure within steam generator 20 is 800 psi to 1000 psi. When pressure within steam generator 20 is greater than 800 psi, fluid travels to steam chamber 26 due to the difference in pressure between steam generator 20 and steam chamber 26.

Once sufficient fluid has entered steam chamber 26, pressure within steam chamber 26 will be at a predetermined preferred pressure. In the present embodiment, the predetermined preferred pressure is about 800 psi. When steam chamber 26 is at 800 psi, chemicals are injected through chemical injection port 30 using injection pump 54 into perforated ignition chamber 28. Fluid is pumped through fluid pipe 46 using high pressure pump 48 into perforated ignition chamber 28. Fluid flowing through fluid pipe 46 is at a temperature between 30 degrees Fahrenheit to 60 degrees Fahrenheit and at a pressure of 1400-3000 psi. Activation of high pressure pump 48 is completed at the same time as ignitor 32 is activated such that ignition of a chemical reaction between chemicals occurs and is pushed by fluid from fluid pipe 46 toward the center of steam chamber 26. Fluid from fluid pipe 46 helps to prevent the energy created by chemical reaction from being localized within perforated ignition chamber 28. Perforated ignition chamber 28 could be damaged by the energy created by chemical reaction if the total force of the chemical reaction was concentrated within it. The injection of chemicals and flowing water through fluid pipe 46 may be controlled manually or automated through the use of a computer. The injection of chemicals, ignition of chemicals, and flowing of water through fluid pipe 46 may be controlled based upon the level of electricity being produced by system 10. Sensors, not shown, provide information regarding energy use for operation of system 10 and energy production. When system 10 is automated, a predetermined net energy production number may be used to determine when additional energy through chemical injection and ignition is needed. This ensures that system 10 is operating in such a manner that more electricity is produced than used in the operation of system 10.

Following chemical injection and ignition, fluid is permitted to exit steam chamber 26 through outlet 31. When present, fluid will flow through steam regulator 56 before traveling through steam turbine 34 to generate electricity using generator 58. Generated electricity may be used immediately, sent to the grid, and/or stored in an electrical storage such as a battery. The destination of the generated electricity may be determined by a user with the flow of generated electricity being controlled by wires, breakers, switches, or any other method known to a person skilled in the art. Generated electricity may be directed to a single location or multiple locations depending upon the user's preference. The destination of generated electricity may be controlled manually or through automated means. After fluid flows through steam turbine 34, it is preferable that fluid return to feed tank 12 through inlet 14 for re-use. This creates a closed loop system that helps to prevent power loss during use. A person of skill will understand that fluid may also be vented to the atmosphere, however this will result in a loss of electric potential since the system would become an open system. Creating an open system is generally only done when needed for safety purposes.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A system of producing electricity, comprising:
 a feed tank having an inlet and an outlet, the feed tank containing a fluid;
 a pump for pumping the fluid through the outlet of the feed tank to a steam generator;
 the steam generator having at least one high temperature heater for heating fluid and increasing pressure within the steam generator;
 a steam chamber in fluid communication with the steam generator, the fluid from the steam generator flowing to the steam chamber, the steam chamber having a chemical injection port through which at least one chemical that creates an exothermic reaction is injected into a perforated ignition chamber, the perforated ignition chamber having an igniter for initiating a chemical reaction; and a steam turbine in fluid communication with the steam chamber such that fluid from the steam chamber flows through the steam turbine to generate electricity.

2. The system of claim 1 wherein the fluid is water.

3. The system of claim 1 wherein the feed tank has at least one heater for heating the fluid.

4. The system of claim 1 further comprising an atmospheric hydraulic extraction system in communication with the steam generator such that the pressure within the steam generator is reducible to below atmospheric pressure to remove air from the system.

5. The system of claim 4 wherein the pressure within the steam generator is reduced to 5 psi.

6. The system of claim 1 wherein the steam chamber has a fluid pipe in fluid communication with the perforated ignition chamber, the fluid pipe carrying fluid having a pressure of 1400-3000 psi at a temperature of 30 degrees Fahrenheit to 60 degrees Fahrenheit, the flow of fluid through the fluid pipe being controlled by a high pressure pump.

7. The system of claim 1 further comprising an electric storage in communication with the steam turbine for storing generated electricity.

8. The system of claim 1 wherein the at least one chemicals injected into the perforated ignition chamber includes hexane, sodium azide, and ethylene oxide.

9. The system of claim 8 wherein 4-20 grams of hexane, 2-16 grams of sodium azide and 1-12 grams of ethylene oxide are injected into the perforated ignition chamber for each 500 kilowatts to be created by the system.

10. The system of claim 1 wherein the fluid flowing through the steam turbine is returned to the feed tank for re-use.

11. A method of producing electricity, comprising:
supplying a fluid to a steam generator;
increasing the temperature of the fluid to between 1500 degrees Fahrenheit to 2100 degrees Fahrenheit and pressure to at least 800 psi;
flowing the fluid to a steam chamber, the steam chamber having a chemical injection port in communication with a perforated ignition chamber, the perforated ignition chamber having an igniter;
injecting at least one chemical that creates an exothermic reaction into the perforated ignition chamber and using the ignitor to initiate an exothermic reaction; and
flowing the fluid through a steam turbine to generate electricity.

12. The method of claim 11 wherein the fluid is water.

13. The method of claim 11 further comprising the step of heating the fluid being supplied to the steam generator in a feed tank to a temperature within 10 degrees Fahrenheit of boiling prior to supplying the fluid to the steam generator.

14. The method of claim 11 further comprising the step of reducing the pressure within the steam generator to remove air from the steam generator prior to increasing the temperature of the fluid.

15. The method of claim 14 wherein the pressure within the steam generator is reduced to 5 psi.

16. The method of claim 11 further comprising the step of injecting fluid having a pressure of between 1400 psi to 3000 psi at a temperature of 30 degrees Fahrenheit to 60 degrees Fahrenheit into the perforated ignition chamber at the time of using the ignitor.

17. The method of claim 11 further comprising the step of storing generated electricity.

18. The method of claim 11 wherein the at least one chemicals injected into the perforated ignition chamber includes hexane, sodium azide, and ethylene oxide.

19. The method of claim 18 wherein 4-20 grams of hexane, 2-16 grams of sodium azide and 1-12 grams of ethylene oxide are injected into the perforated ignition chamber for each 500 kilowatts to be created by the system.

20. The method of claim 11 further comprising the step of returning the fluid flowing through the steam turbine to the feed tank for re-use.

* * * * *